Nov. 5, 1940.  F. C. ALBRIGHT  2,220,194
AIRCRAFT CONTROL MEANS
Filed June 10, 1938  2 Sheets-Sheet 2
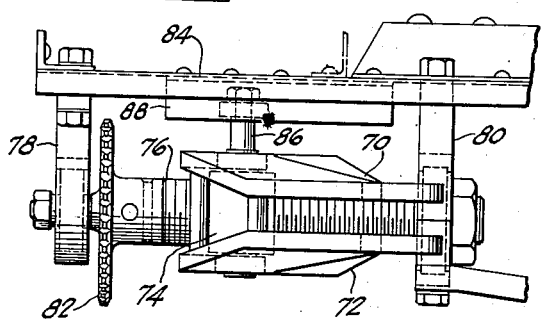
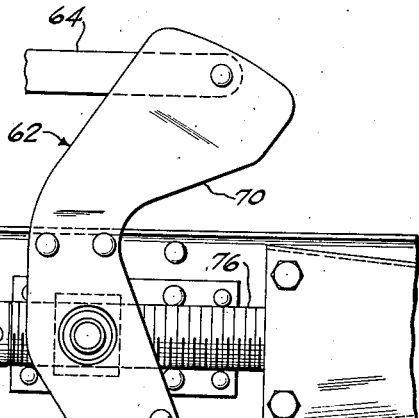
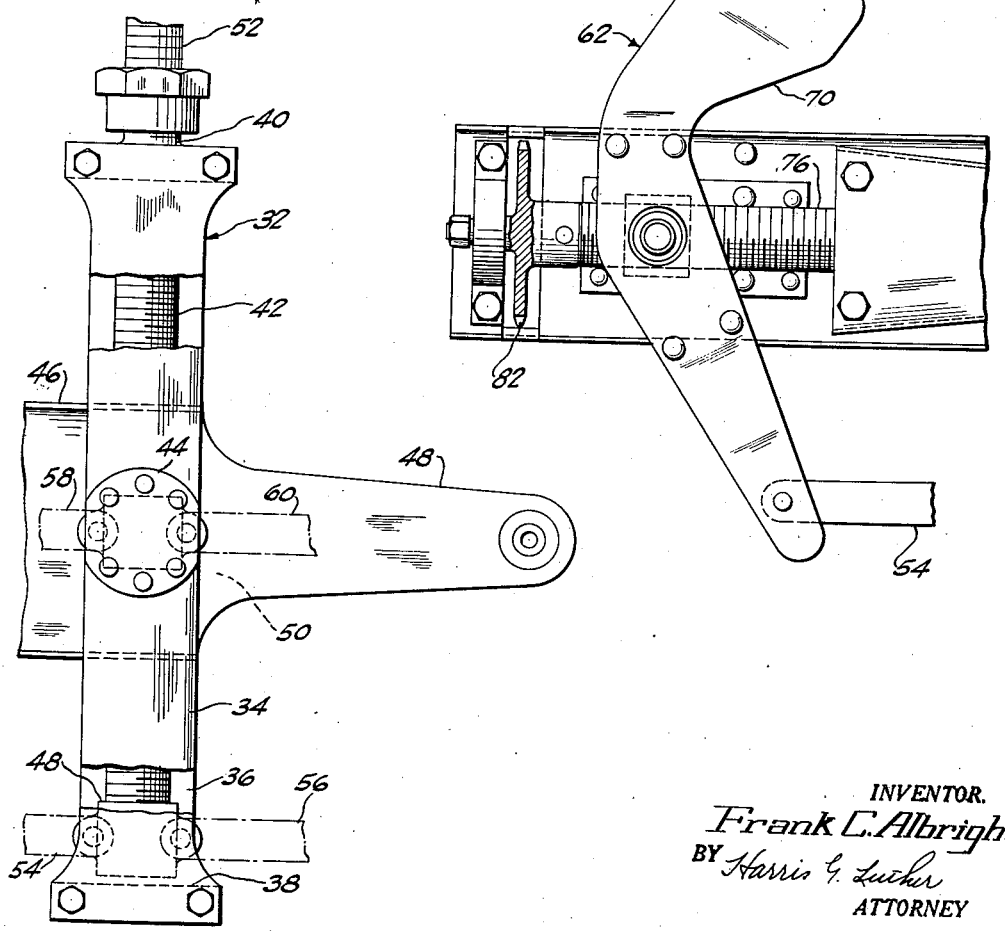
INVENTOR.
Frank C. Albright
BY Harris G. Luther
ATTORNEY Patented Nov. 5, 1940

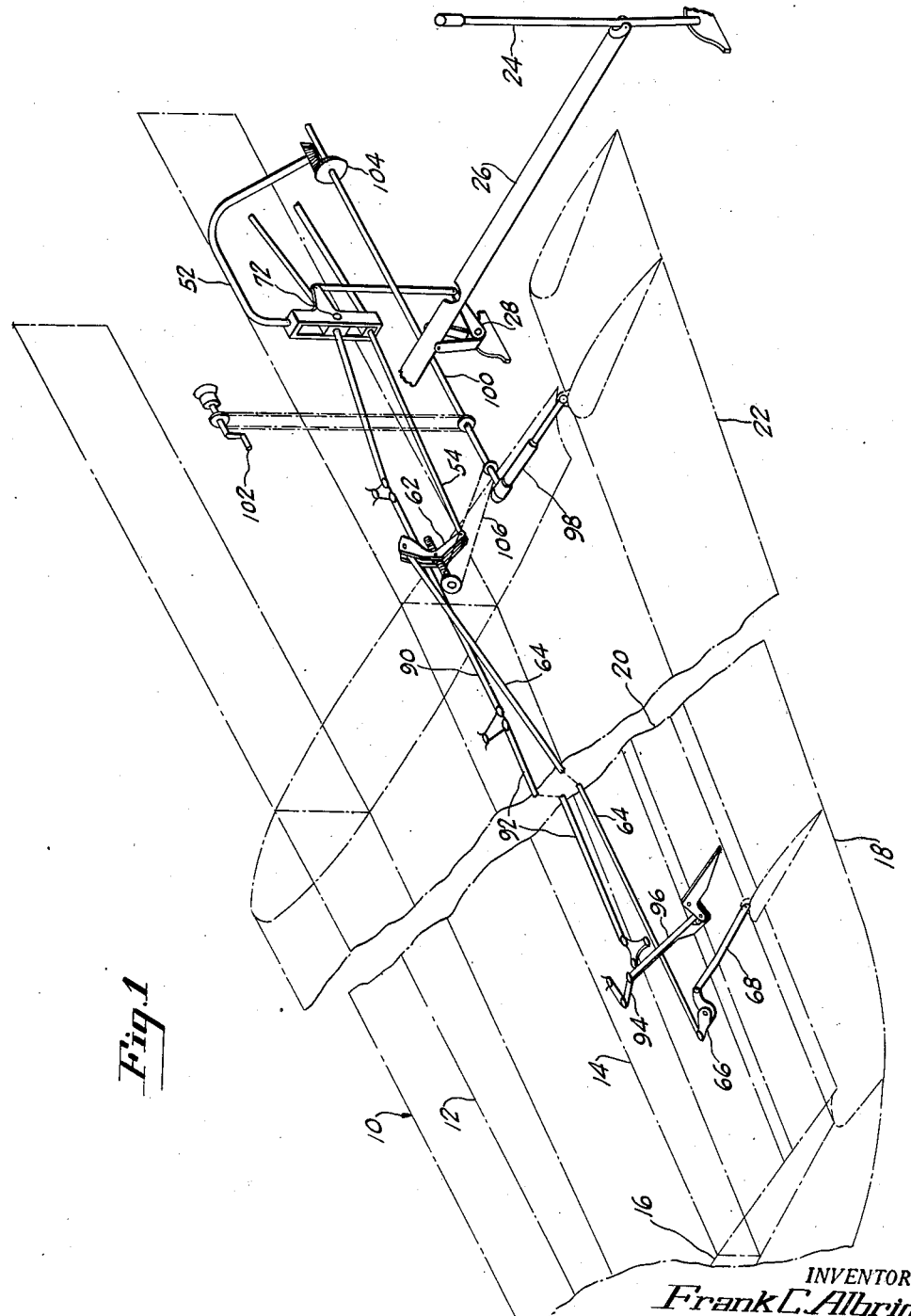

2,220,194

UNITED STATES PATENT OFFICE 2,220,194

AIRCRAFT CONTROL MEANS

Frank C. Albright, Manchester, Conn., assignor to United Aircraft Corporation, East Hartford, Conn., a corporation of Delaware Application June 10, 1938, Serial No. 212,996

6 Claims. (Cl. 244—42)

This invention relates to improvements in aircraft control means and has for an object the provision of an improved arrangement for operating a plurality of flight control means or instrumentalities from a single operating device.

A further object resides in the provision in combination with a plurality of airplane flight control instrumentalities of means for acting upon these instrumentalities to change their condition corresponding to a particular flight condition to a condition corresponding to a different flight condition.

A still further object resides in the provision of a single control means for simultaneously acting upon a plurality of aircraft flight control instrumentalities to change the conditions of such instrumentalities from a condition corresponding to a certain flight condition of the aircraft to a condition corresponding to a different flight condition of the aircraft.

Other objects and advantages will be more particularly pointed out hereinafter or will become apparent as the description proceeds.

In the accompanying drawings in which like reference numerals are used to designate similar parts throughout, there is illustrated by way of example, a particular form and arrangement of the improved control means. The drawings, however, are for the purpose of illustration only and are not to be taken as limiting or restricting the invention as set forth in the accompanying claims.

In the drawings,

Fig. 1 is a perspective diagrammatic view of an airplane wing showing flight control instrumentalities applied thereto and means arranged according to the invention for acting upon these various instrumentalities.

Fig. 2 is a detail view on an enlarged scale of a lift spoiler-aileron changeover device schematically shown in Fig. 1.

Fig. 3 is a top plan view of an aileron drooping element schematically illustrated in Fig. 1, and, Fig. 4 is a side elevational view of the aileron drooping device shown in Fig. 3.

Referring to the drawings in detail and particularly to Fig. 1, the numeral 10 generally indicates an airplane wing having spars or stiffeners 12 and 14 and rib sections as schematically indicated at 16. The wing has hinged to its rearward portion, adjacent its ends, movable ailerons as indicated at 18 for lateral control, lift spoilers positioned ahead of the ailerons, as indicated at 20, and also used for lateral control, and a lift increasing trailing edge flap, as indicated at 22, hinged to the rearward portion of the wing between the ailerons 18.

Since the advent of modern high-performance airplanes having very high flight speeds and also very high wing loadings it has been found necessary to provide auxiliary means to, in effect, increase the wing lift of such airplanes at slow flight speeds in order to provide safe landing speeds for such airplanes. The most successful of these lift increasing devices have been movable flaps of various forms connected at or near the rearward edge of the wing and tiltable downwardly to increase the effective wing camber. Various forms of such lift-increasing flaps are well known to the prior art, one form being particularly illustrated and described in Patent No. 2,117,607, issued May 17, 1938, to R. W. Griswold, II, for Slotted deflector flaps.

While the flap 22, disposed between the ailerons 18, is effective to materially increase the lift of the wing 10, it is obvious that a much greater increase could be obtained if the flap extended for the entire span of the wing instead of only for the distance between the inner end of each aileron and the fuselage in those cases where the wing is connected directly to the fuselage of the airplane. Since a full-span flap would, however, necessitate dispensing with the ailerons, such a construction has not been considered desirable. It is apparent, however, that when the ailerons are retained the lift increasing effect of the flap could be greatly facilitated if the ailerons were inclined or drooped at the same time the lift increasing flap was inclined, to thereby provide, in effect, a full-span flap having end portions somewhat less efficient in lift-increasing effect than the center portion. Such arrangements have been successfully used but are subject to the disadvantage that the ailerons cannot be radically inclined without losing, to a considerable extent, their lateral control effectiveness at a time when the maximum effectiveness in lateral control is necessary, that is when the airplane is flying at a minimum speed and approaching a landing. It is also known to be possible to obtain lateral control by means of lift spoilers positioned intermediate the chord length of the wing. Such lift spoilers, however, are subject to the disadvantage that they create considerable drag and are not as smooth and efficient in operation at high speeds as are ailerons. In the wing construction illustrated, the above-mentioned disadvantages have been overcome by providing both ailerons and lift spoilers and control means so arranged that the lateral control of the airplane is effected by the ailerons when the airplane is in a high-speed flight condition and by the lift spoilers when the airplane is in a low-speed flight condition. This arrangement permits drooping the ailerons to the full extent of inclination of the lift increasing wing flap and avoids the necessity of attempting to retain lateral control by the ailerons when in such a drooped or inclined position.

The construction illustrated then particularly contemplates two flight conditions, viz., a high-speed flight condition in which the lift-increasing flap 22 is in its uppermost or neutral position, the lift spoilers 20 are closed and inoperative and the entire lateral control of the aircraft is effected by the aileron 18 in response to lateral or sideways movement of the control column 24; and a low-speed flight condition in which the flap 22 is inclined downwardly with respect to the wing 10, the ailerons 18 are drooped to an angle conforming to the inclination of the flap, and the lateral control function has been transferred from the ailerons to the lift spoilers 20. As stated above, one of the objects of this invention resides in the provision of suitable apparatus for changing the various control instrumentalities from one to the other of the above described flight conditions by the actuation of a single control element.

In the construction illustrated the control column 24 is connected by means of the torque tube 26, the bracketed arm 28, and the link 30 to the aileron-spoiler changeover mechanism, generally indicated at 32 in Fig. 1, and particularly illustrated in Fig. 2. As shown in Fig. 2, the device 32 comprises a frame constituted by a pair of side-plates 34 and 36 secured together at their ends by abutments 38 and 40 rotatably supporting the screw shaft 42. Intermediate their length the plates 34 and 36 are provided with bearings one of which is indicated at 44 by means of which the changeover device is pivotally mounted at a point at or near its longitudinal center upon a fixed member 46 of the airplane. An arm 48 extends outwardly from the center portion of the device 32 and is connected to the upper end of the link 30 so that the device 32 is tilted about the pivotal mounting 44 upon lateral movement of the control column 24. The shaft 42 is threaded through spaced-apart nuts 48 and 50 and is rotatable by the flexible drive 52 to change the position of the nuts 48 and 50 along the length of the shaft from a position in which the nut 50 is at the center of the shaft opposite the pivotal mounting 44 and the nut 48 is at the bottom end of the shaft, to a position in which the nut 48 is at the center of the shaft opposite the pivotal mounting and the nut 50 is at or near the upper end of the shaft. The ends of link rods 54 and 56 are pivotally connected to the nut 48 and the ends of similar link rods 58 and 60 are pivotally connected to the nut 50.

Referring now to Fig. 1, it will be observed that the end of the link rod 54 opposite the device 32 is connected to one end of an adjustable fulcrum lever generally indicated at 62 in Fig. 1 and illustrated in detail in Figs. 3 and 4. A link rod 64 is pivotally connected to the opposite end of the lever 62 and to one end of a pivotally mounted bell-crank lever 66, the opposite end of which is connected by a link 68 to an apertured lug or ear on the upper surface of the pivotally mounted left-hand aileron 18. The link rod 56 is operatively connected in a similar manner to the right-hand aileron.

Reference is now had to Figs. 3 and 4 for a detailed description of the adjustable fulcrum lever 62. This mechanism includes two similar bent lever members 70 and 72 both pivotally mounted intermediate their length upon a slidable block 74 threaded upon a screw-threaded shaft 76 rotatably supported at its end in the bearing brackets 78 and 80 and provided adjacent one end with a chain sprocket 82. The bearing brackets 78 and 80 are rigidly attached to a fixed member 84 of the airplane wing, and the block 74 and lever members 70 and 72 are restrained against rotation about the axis of the shaft 76 by means of a guide pin 86 running in a track 88 secured to the fixed member 84. With this construction it is apparent that the fulcrum of the lever members 70 and 72 can be shifted along the length of the shaft 76 by rotating the screw-threaded shaft. It is also apparent that if the link 54 be held against longitudinal movement while the fulcrum is shifted the link 64 will be moved to move the aileron to which it is operatively connected up or down about its pivotal connection with the wing. With this arrangement if the links 54 for both ailerons are held and the fulcrums of both lever members 62 are moved outwardly both ailerons will be simultaneously inclined downwardly or drooped.

Referring again to Fig. 1, the link 58 is connected through the intermediate links 90 and 92 with a toggle mechanism generally indicated at 94 and particularly illustrated and described in application Serial No. 214,486 filed June 18, 1938, by Rex B. Beisel, for Airplane control devices, which has matured into Patent 2,181,508, which toggle mechanism is operatively connected through the link 96 with the left-hand spoiler 20. The link 60 is connected in a similar manner with the right-hand spoiler to effect lateral control of the airplane by the lift spoilers under certain operating conditions. Whether the lateral control is by the ailerons or by the spoilers depends upon the position of the nuts 48 and 50 on the screw shaft 42. When the nuts are in their lowermost position, as illustrated in Fig. 2, the lateral control will be effected by the ailerons and when the nuts are in their uppermost positions the lateral control will be effected by the lift spoilers and the aileron link rods 54 and 56 will be held against longitudinal movement.

The lift increasing flap 22 is operated by some suitable means such as the screw-threaded extension device or screw jack 98 which may be of a form well known to the art. In the arrangement illustrated the flaps may be operated by two such screw jacks, one of which is not illustrated but which would be located at the end of the shaft 100 opposite the end connected to the illustrated jack. A larger number of screw jacks may be used if desired, such number depending upon the length and structural strength of the flap which they operate. Whatever the number may be, all of the screw jacks are simultaneously operated by the line shaft 100 which is rotated by some suitable mechanism such as the crank 102 mounted upon a fixed portion of the airplane and operatively connected with the line shaft by suitable means such as a chain and chain sprockets. While a manually rotatable crank has been illustrated for turning the line shaft 100 it is to be understood that this shaft may be turned by other suitable devices such as an electrically or hydraulically operated motor, or a wind-driven power device; subject to manual control by the pilot of the airplane.

The flexible drive 52 of the changeover device 32 extends to an operative connection with the line shaft 100 which connection may be in the form of a pair of bevel gears as indicated at 104 and both of the adjustable fulcrum lever devices are operatively connected with the line shaft 100 by suitable means such as the chain and sprocket drive indicated at 106.

From the above description it will be observed that the airplane may be changed from a high-speed flight condition to a low-speed flight condition, in which the lift-increasing flap 22 is inclined, the ailerons 18 are drooped and the lateral control is transferred from the ailerons to the lift spoilers 20, by manipulation of the crank 102 in one direction and may be restored to its high-speed flight condition by a manipulation of the crank in the opposite direction. If desired other instrumentalities which coincide in their operation with the operation of the control mechanism mentioned above; such as a retractible landing gear, for example, could also be operatively associated with the single control device to be driven either directly from the control device or from the line shaft 100.

While a particular constructional arrangement has been illustrated for the purpose of disclosing the invention it is to be understood that the invention is not limited to the particular construction and arrangement so illustrated and described but that such changes in the size, shape and arrangement of parts may be resorted to as come within the scope of the sub-joined claims.

Having now described the invention so that others skilled in the art may clearly understand the same, what it is desired to secure by Letters Patent is as follows:

What is claimed is:

1. In an airplane having both ailerons and lift spoilers for lateral control and a lift increasing wing flap, means for rendering said ailerons alone operative for lateral control under high-speed flight conditions and for rendering said lift spoilers alone operative for lateral control under slow-speed flight conditions and means for inclining said wing flap to increase the lift coefficient of the airplane wing, and for retracting said flap, and a single control for simultaneously actuating all of said means.

2. In an airplane having both ailerons and lift spoilers for lateral control and a lift increasing wing flap, means operative to simultaneously shift the lateral control function from said ailerons to said lift spoilers, droop said ailerons and incline said wing flap to place said airplane in condition for slow-speed operation, and to return said ailerons from said drooped position, shift the lateral control function from said lift spoilers to said ailerons and return said wing flap to its neutral position to place said airplane in condition for high-speed operation, and a single manually controlled device for operating said means.

3. In an airplane having a wing, ailerons operatively connected with said wing to provide lateral control for said airplane and a wing flap between said ailerons inclinable with respect to said wing to increase the lift thereof, means for drooping said ailerons when said flap is inclined, to approximately the same degree of inclination as that of the flap to provide in effect a full span lift increasing flap for said wing, and means independent of said ailerons and said flap for providing lateral control for said airplane when said ailerons are drooped.

4. In combination with an airplane wing, a pair of ailerons carried thereby and means including a plurality of link members for moving said ailerons in opposite directions, means for simultaneously inclining both ailerons downwardly comprising, a pair of levers each connected at its opposite ends to adjacent ends of link members controlling the respective aileron, a fulcrum pin intermediate the length of each lever, and means for locking one link of each pair of lever connected links against lengthwise movement and simultaneously moving said lever fulcrums to change the distance between the adjacent ends of each pair of links.

5. In an airplane having both ailerons and lift spoilers for lateral control, means for alternating the lateral control function between said lift spoilers and said ailerons, means for drooping said ailerons when the lateral control function is transferred to said lift spoilers, and a single device for actuating all of said means.

6. In an airplane having both ailerons and lift spoilers for use as different sets of lateral control instrumentalities, means for transferring the lateral control function from one set of said instrumentalities to the other and for simultaneously locking the set from which the lateral control function is transferred, means for drooping said ailerons when the lateral control function is transferred to said lift spoilers, and a single control for both of said means.

FRANK C. ALBRIGHT.